United States Patent [19]

Luder

[11] 4,194,092
[45] Mar. 18, 1980

[54] DEVICE FOR DETECTING A FREQUENCY IN A PCM CODED SIGNAL

[75] Inventor: Jacques Luder, Ris Orangis, France

[73] Assignee: Compagnie Industrielle des Telecommunications, Paris, France

[21] Appl. No.: 913,163

[22] Filed: Jun. 6, 1978

[30] Foreign Application Priority Data

Jun. 10, 1977 [FR] France .............................. 77 17814

[51] Int. Cl.² .......................... H04Q 1/46; H04B 3/20
[52] U.S. Cl. .............................. 179/84 VF; 179/170.4
[58] Field of Search ............... 179/170.2, 170.4, 170.6, 179/170.8, 175.31 E, 84 VF, 15 AP, 15 BY; 324/78 D

[56] References Cited

U.S. PATENT DOCUMENTS

| 3,624,520 | 11/1971 | Perkins, Jr. et al. | 179/15 AP |
| 3,647,993 | 3/1972 | Foulkes et al. | 179/170.2 |
| 3,783,194 | 1/1974 | Vilips et al. | 179/170.2 |
| 3,935,403 | 1/1976 | Penicaud et al. | 179/170.2 |

*Primary Examiner*—Bernard Konick
*Assistant Examiner*—Randall P. Myers
*Attorney, Agent, or Firm*—Sughrue, Rothwell, Mion, Zinn and Macpeak

[57] ABSTRACT

The invention relates to a device for digitally detecting a frequency in a PCM signal.

In accordance with the invention, an up/down counter is provided which receives a up-count pulses when there is a change of sign in the signal to be checked and which receives r down-count pulses when there is no change of sign in this signal. The numbers a and r are determined as a function of the ratio between the sampling frequency of the PCM signal and the frequency to be detected, so that it is possible to deduce the presence of this frequency from a balance between the number of up-count pulses and the number of down-count pulses.

Application: detecting the neutralization tone for an echo suppressor in a PCM telephone line.

2 Claims, 3 Drawing Figures

DEVICE FOR DETECTING A FREQUENCY IN A PCM CODED SIGNAL

The invention relates to the technique of processing a PCM coded signal, i.e. in which the original signal has been sampled and in which the amplitude of each sample has been converted into digital code.

The invention applies in particular to the detection of a given frequency in such a signal.

This frequency can for example be a data transmission signalling frequency on a telephone line. When data is transmitted on a telephone line, the echo suppressors which are disposed at the ends of the line must be neutralized. For this purpose, data transmission is preceded by a particular frequency and arrangements for detecting this frequency are provided near the echo suppressors for detecting this frequency, thereby allowing the echo suppressors to be neutralized.

In analog echo suppressors, this operation is carried out by means of filters. In the case of digital echo suppressors, the direct transposition of analog methods would lead to expensive embodiments. A simpler embodiment has already been recommended by the Applicant in published French patent application 2 240 583.

Preferred embodiments of the invention further reduce the number of components of such an arrangement and increase its reliability.

The present invention provides an arrangement for detecting a frequency $f_1$ in a signal which is in PCM coded form, whose sampling frequency is $f_2$, $f_2 \approx p/qf_1$, p and q being integers and p being greater than 2q, including a circuit which delivers a pulse at each change of sign of said signal and a counting circuit for counting these pulses during a measurement period, wherein the counting circuit is constituted by an up-/down counter which operates at the frequency $f_2$, which shifts in a first direction a number of steps a each time said pulse appears and which shifts in a second direction a number of steps r when said pulse does not appear, a and r being such that the ratio a/r is equal to p−2q/2q and a means for detecting whether the up/down counter deviates by more than a predetermined number of steps which is a function of p and q from a given position at which it is initialized at the beginning of the measurement period, the presence of the frequency $f_1$ being characterized by the absence of such detection during the measurement period.

In a particular embodiment of the invention, where $\epsilon \times f_2 = p/q \times f_1$ and where $\epsilon$ is close to unity, the up-/down counter also receives at the frequency $|\epsilon - 1| \times f_2$ pulses for correction shifting in said second direction if $\epsilon$ is greater than "1" and for correction shifting in said first direction if $\epsilon$ is lower than "1".

Two embodiments of the invention will be described hereinbelow in greater detail with reference to two figures.

Figure 1:
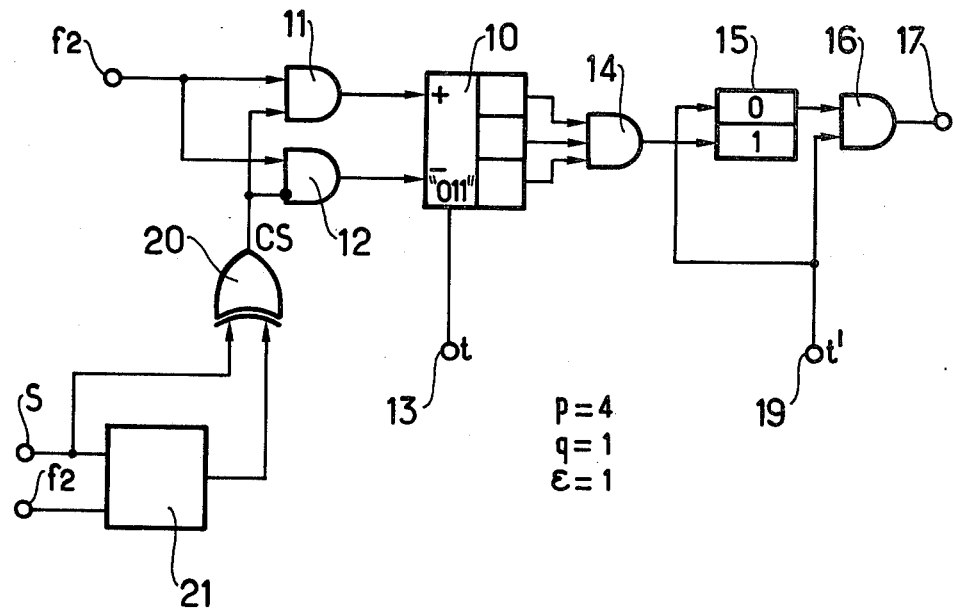
FIG. 1 shows schematically an arrangement in accordance with the invention in the case where $\epsilon$ is exactly 1.
Figure 2:
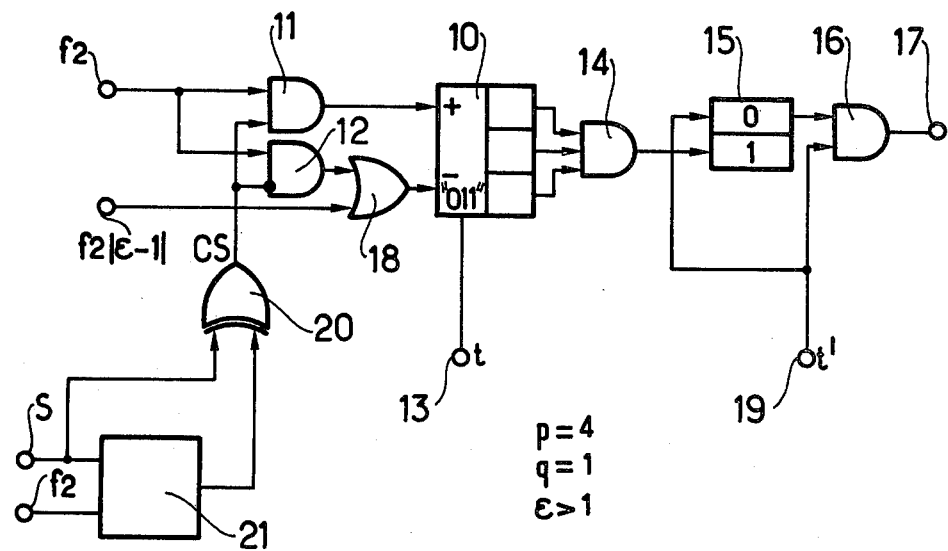
FIG. 2 shows a variant of the device in accordance with the invention in the case where $\epsilon$ is slightly greater than 1.

FIG. 1 shows schematically the simplest arrangement for a device in accordance with the invention, in the case where p=4, q=1 and $\epsilon$=1. By way of example, take $f_2$ as the sampling frequency of a PCM coded telephone channel i.e. $f_2$=8000 Hz; the aim of the arrangement of FIG. 2 is then to detect the presence of a frequency $f_1$=2000 Hz. It is then seen that there are as many samples which change sign in relation to the preceding sample as there are samples which do not change sign.

The arrangement in accordance with FIG. 1 receives the sign of the successive samples on an input S. An exclusive-OR gate 20 delivers a binary signal CS which indicates whether or not the sign of a sample in question differs from the sign of the preceding sample. This gate 20 monitors the binary signal at the input and at the output of a bistable 21 which receives successive signs at the sampling frequency $f_2$.

This binary signal CS is applied to an up/down counter 10 via two AND gates 11 and 12 respectively. The up/down counter has two inputs ("+" and "−") respectively, for up-counting and for down-counting. These two inputs are connected to the outputs of the gates 11 and 12. The gate 11 which controls up-counting receives, besides the binary signal CS, the sampling frequency $f_2$ (8000 Hz) in the form of short pulses. The gate 12 which controls down-counting receives the binary signal CS in inverted form and also the sampling frequency $f_2$. Each time a pulse is applied via the gate 11 to the up-count control input ("+") of the up/down counter 10, the counter advances one step; each time a pulse is applied via the gate 12 to the down-count input ("−"), the up/down counter 10 goes back one step.

A third input of the up/down counter which, in the example in question includes three bistables, is called "011". A pulse which comes from a terminal 13 and which is applied to this third input sets the up/down counter in the state 011 which is situated in the middle of an operation range, namely P, which extends between the states 000 and 110. The terminal 13 receives clock pulses with a repetition period of t.

The outputs of the up/down counter 10 are applied to an AND gate 14 which delivers a binary "1" signal only when the up/down counter exceeds the previously mentioned range P, i.e. in this case, when the up/down counter is at its full capacity (state 111). The output of the gate 14 is connected to the input of a memorizing bistable 15, which is reset to zero by a pulse which comes from a terminal 19. The complement output of this bistable is connected to an output AND gate 16 which is also controlled by the pulse which comes from the terminal 19. The output 17 of the AND gate 16 constitutes the output of the device. The terminal 19 receives clock pulses with a repetition period of t' which is a multiple of the clock period t.

The device operates as follows:

If the sampling frequency is four times higher than the frequency to be detected, as many changes of sign are observed, on an average, for successive sampling periods as there are no changes of sign. Consequently, the up/down counter 10 operates at a speed of 8000 Hz alternately up-counting and down-counting. At the beginning of a period t a pulse which comes from the terminal 13 sets the up/down counter in the middle of the range P. If it does not exceed this range, i.e. here, if it never reaches the state 111, the frequency is 2000 Hz. The resetting to the state 011 by the pulse which defines the period t is intended to allow a band of frequencies centreed on 2000 Hz to be detected. The shorter the period, the wider the detected frequency band.

It should be observed that when this frequency is not used, the up/down counter 10 rapidly reaches the state 111 either by excess up-counting or by excess down-counting and thus switches the bistable 15.

It should also be observed that the device in accordance with the invention not only checks whether the frequency sought is present on average, but it also indicates whether the signal to be checked deviates briefly but appreciably from this average frequency.

Due to this, the device in accordance with the invention is responsive to fluctuations in the signal $f_2$ without the use of special means. A fluctuation of the frequency during the total measurement time $t'$ causes the signal not to be considered as the frequency sought. The length of the period $t'$ defines its degree of insensitivity to fluctuations.

If the value of p/q is not four the count balance is no longer provided by one step up or down respectively, since analysis of the signal indicates that there is no longer an average of one sample without change of sign, for one example with change of sign, when the frequency to be detected is applied.

More generally, q periods of the frequency to be detected are considered: on these q periods, there is an average of $p-2q$ samples without change of sign and $2q$ samples with change of sign. It is therefore sufficient to make the up/down counter advance $p-2q$ steps each time there is a change of sign and to make it go back 2q steps each time there is no change of sign; of course if q is equal to 1 and p is an even number, these numbers of steps are divided by two. In short, the number of steps—i.e. a—by which the up/down counter is advanced at each change of sign and the number of steps—i.e. r—which the up/down counter is made made to go back each time there is no change of sign are such that the ratio a/r is equal to $p-2q/2q$.

It will be observed that the up/down counter 10 can be produced by means of an adder followed by D-type bistables looped back to a first group of inputs of the adder; a second group of inputs of the adder is connected to the output of a memory—a ROM for example—in which are stored the numbers a and -r and the reading of which is controlled at the rate of $f_2$ by the signals CS and $\overline{CS}$, i.e. on referring to FIG. 1, by the output signals of the gates 11 and 12. The state of the up/down counter is of course defined by the respective states of the bistables and the up/down counter is initialized at the beginning of each period t by a forced setting of the bistables in the corresponding states.

The extent of the aforementioned range P and from which the dimensions of the up/down counter are chosen is determined as a function of p and q. An example of the case where p=4q has been given previously.

When p is greater than 4q, there are observed groups of consecutive samples without change of sign separated by isolated samples with change of sign. It will easily be seen that these groups are constituted by a number of samples equal at the most to a number k such that $k-1 \leq p-2q/2q < k$. It is therefore necessary in this case for the up/down counter, starting from the middle of the range P, to be able to go back at least $k \times 2q$ steps without exceeding this range. The more the range P exceeds $2 \times k \times q$, the wider the frequency band about $f_1$, which can be detected.

Similarly, it can be seen that when p lies between 2q and 4q, it is necessary for the up/down counter, starting from the middle of the range P, to be able to advance at least $k' \times (p-2q)$ steps, $k'$ being an integer such that $k'-1 \leq 2q/p-2q < k'$, without exceeding this range. Here again, the more the range P exceeds $2 \times k' \times (p-2q)$, the wider the frequency band about $f_1$, which can be detected.

If the frequency $f_1$ is not exactly a whole or fractional sub-multiple of the frequency $f_2$, or again if the frequency $f_1$ is not exactly a simple fractional sub-multiple of the frequency $f_2$ (simple fractional sub-multiple: p and q not very high), the device of FIG. 1 is slightly modified, the modified device being shown in FIG. 2. In this case, it is considered that $\epsilon \times f_2 = p/qf_1$; $\epsilon$ being about unity.

For example, it is required to detect a 2100 Hz signalling frequency $f_1$ for an 8000 Hz sampling frequency $f_2$. In these conditions, p is equal to 4 and q is equal to 1 and $\epsilon$ is equal to to 1.05.

In FIG. 2, the same references as in FIG. 1 are used for components which have the same functions. There is provided between the gate 12 and the down-count input of the up/down counter 10, an OR gate 18 which receives firstly the output of the gate 12 and secondly a sequence of pulses at the rate $(\epsilon - 1)f_2 = 400$ Hz, i.e. one pulse every twenty pulses of the sampling frequency $f_2$. These pulses applied to the gate 18 are slightly delayed in relation to the pulses $f_2$ to prevent coincidence with these latter. By this modification, an extra pulse is introduced at the down-counting input of the up/down counter 10 after twenty pulses $f_2$ and when the frequency of 2100 Hz is applied, the up/down counter then never reaches the state 111.

Of course, this extra pulse would have to be added to the up-count input if $\epsilon$ was for example 0.95.

Figure 2A:
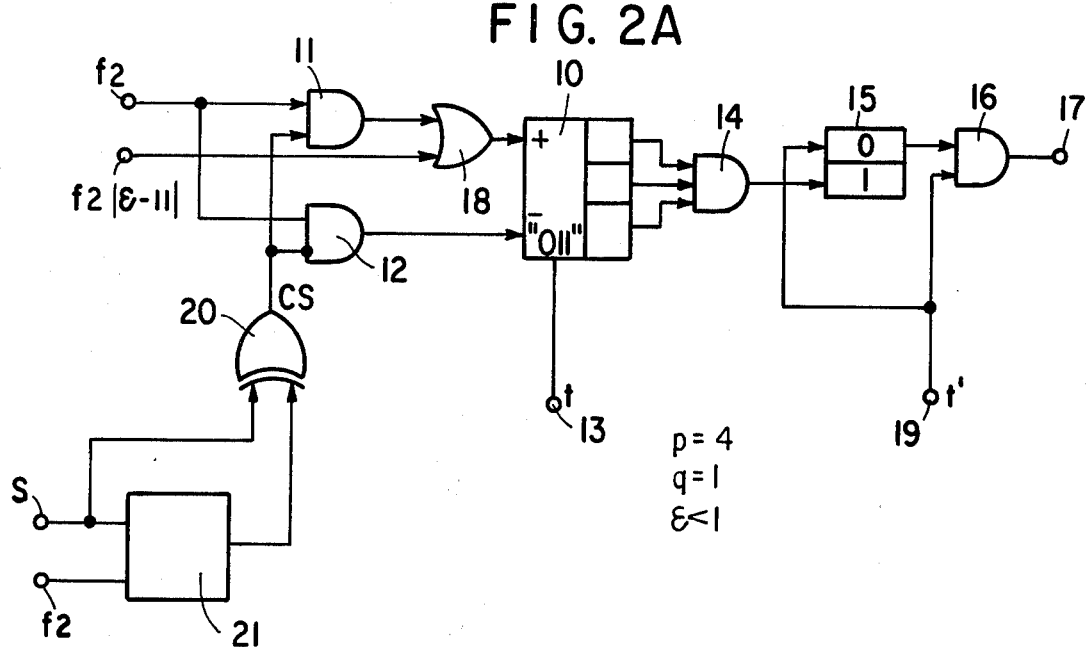
FIG. 2A shows a variant of the device in accordance with the invention in the case where $\epsilon$ is slightly less than 1.

When $\epsilon < 1$, FIG. 2A is employed where FIG. 2A is a slight modification of FIG. 2. In FIG. 2A, one input of OR gate 18 is the output of AND gate 11 instead of the output of AND gate 12 and the other input of OR gate 18 is the correction shifting signal of frequency $f_2|\epsilon - 1|$, where $\epsilon < 1$. The output of OR gate 18 is connected to the up-count input of up/down counter 10 for correction shifting of said counter in a direction opposite to that in FIG. 2.

There is thus a very simple means of adapting the arrangement to the various frequencies to be monitored.

Particular embodiments of the invention have been described, but it is quite evident that modifications can be made thereto and/or that some means can be replaced by other technically equivalent means without thereby going beyond the scope of the invention. In particular, it is quite evident that instead of making the up/down counter advance when a change of sign is observed and of making it go back when there is no change of sign, it could be made to go back in the first case and to advance in the second case.

I claim:

1. An arrangement for detecting a frequency $f_1$ in a signal which is in PCM coded form, whose sampling frequency is $f_2$, $f_2 \approx p/qf_1$, p and q being integers and p being greater than 2q, including a circuit which delivers a pulse at each change of sign of said signal and a counting circuit for counting this pulse during a measurement period, wherein the counting circuit is constituted by an up/down counter which operates at the frequency $f_2$, which shifts in a first direction a number of steps a each time said pulse appears and which shifts in a second direction a number of steps r when said pulse does not appear, a and r being such that the ratio a/r is equal to $p-2q/2q$ and a means for detecting whether the up/down counter deviates by more than a predetermined number of steps which is a function of p and q from a given position at which it is initialized at the beginning of the measurement period, the presence of the frequency $f_1$ being characterized by the absence of such detection during the measurement period.

2. An arrangement according to claim 1, in the case where $\epsilon \times f_2 = p/q \times f_1$ where $\epsilon$ is close to unity, wherein the up/down counter also receives pulses for correction shifting in said second direction if $\epsilon$ is greater than "1.0" and for correction shifting in said first direction if $\epsilon$ is lower than "1.0".

* * * * *